(12) United States Patent
 Hinks

(10) Patent No.: US 10,309,371 B2
(45) Date of Patent: Jun. 4, 2019

(54) SMOOTH PITCH CONTROL FOR PROPELLERS AND ROTORS

(71) Applicant: William L. Hinks, Akron, OH (US)

(72) Inventor: William L. Hinks, Akron, OH (US)

( * ) Notice: Subject to any disclaimer, the term of this patent is extended or adjusted under 35 U.S.C. 154(b) by 393 days.

(21) Appl. No.: 15/161,181

(22) Filed: May 20, 2016

(65) Prior Publication Data

US 2017/0334549 A1 Nov. 23, 2017

(51) Int. Cl.
  *F03D 7/02* (2006.01)
  *B64C 11/06* (2006.01)

(52) U.S. Cl.
  CPC ............ F03D 7/0224 (2013.01); B64C 11/06 (2013.01); *F05B 2260/79* (2013.01); *F05B 2280/5001* (2013.01); *Y02E 10/723* (2013.01)

(58) Field of Classification Search
  CPC ......... B64C 27/35; B64C 27/48; B64C 11/06; B64C 11/343; B64C 11/346; B64C 11/12; F16C 7/04; F03D 7/0224; F05B 2260/70; F05B 2260/74; F05B 2260/77; F05B 2260/79; F05B 2280/5001; F05B 2240/52; Y02E 10/723
  USPC ...................................................... 416/134 A
  See application file for complete search history.

(56) References Cited

U.S. PATENT DOCUMENTS

| | | | | |
|---|---|---|---|---|
| 2,086,686 A | * | 7/1937 | Weible | F03D 7/0224 416/51 |
| 3,790,302 A | * | 2/1974 | Pascher | B64C 27/32 416/102 |

\* cited by examiner

*Primary Examiner* — Carlos A Rivera
*Assistant Examiner* — Justin A Pruitt

(57) ABSTRACT

A rotor hub provides transfer of centrifugal force while permitting angular motion about a pitch axis, having an outer member and an enveloped concentric inner member with a hollow end part, the two members joined by two spaced radial bearings and each having two diametrically opposed windows that are aligned such that a beam transverse to the pitch axis passes through all four windows, transferring the centrifugal force from the outer member through a small elastomeric thrust bearing within the hollow part to an end cap of the inner member.

3 Claims, 3 Drawing Sheets

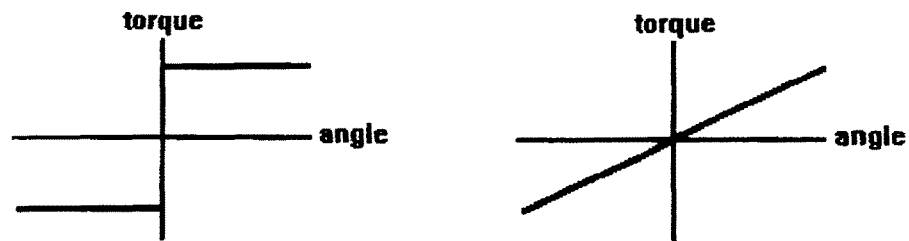
FIG. 1
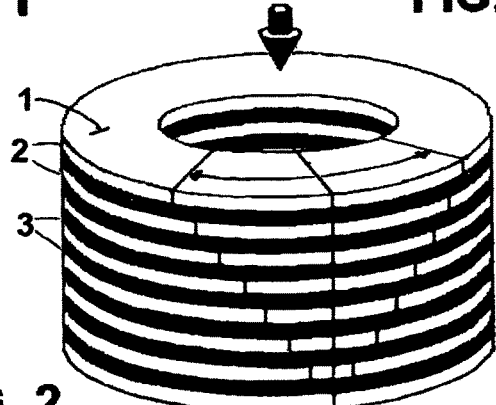
FIG. 2
FIG. 3
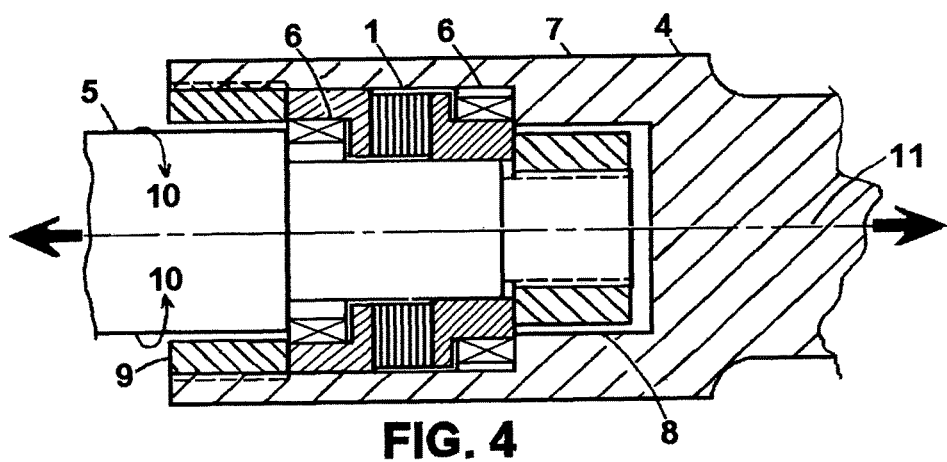
FIG. 4

SMOOTH PITCH CONTROL FOR PROPELLERS AND ROTORS

BACKGROUND OF THE INVENTION

This invention applies to airplane propellers and horizontal-shaft wind turbine rotors that have variable pitch control of their individual blades, and particularly to the cases where such control is achieved by means of a passive balance of torques resulting from the application of springs and speed-sensitive and/or aerodynamic forces acting upon the pitch axis. (The terms "propeller" and "rotor" will be used interchangeably except as otherwise noted).

In the prior art, it has been customary to retain each individual blade relative to a central rotor or propeller hub by means of rolling-element thrust bearings to permit angular variation of the blade pitch. The blade-root hub often comprises a spindle or pitch shaft telescoped within and relatively movable angularly via two spaced radial bearings that define a pitch or feathering axis with respect to an outer housing or structure, where one of the spindle or housing is attached along the pitch axis to the individual blade and the other to the central rotational axis of the rotor. Within the configuration of the hub, between or outboard of the two radial bearings, means are provided for transfer of thrust loads between the spindle and the housing, Ball or roller thrust bearings may be heavily loaded by the centrifugal forces experienced by each blade due to its mass as it rotates rapidly about the central axis of the rotor.

Despite rolling-element bearings generally having a relatively low coefficient of friction, the high centrifugal thrust load may cause friction torque not only to be substantial compared to the torque available to overcome it, but it also has other undesirable characteristics. For instance, ball or roller bearings, particularly upon wear and lack of lubrication may develop a "lumpiness" or unevenness in their friction torque as they rotate through an angle of pitch, interrupting the smooth application of changes in control torque and resulting in uneven pitch angular response. This incremental change of torque is extreme, however, upon reversal of direction: friction torque of a rolling-element bearing abruptly reverses when the direction of feathering motion of the blades is reversed (as will be seen in the instant FIG. 1), making for a "jump" or step in pitch angle change rather than a smooth and accurate response to the controlling torque.

This unevenness of response may be particularly noticeable when the net torque upon the pitch axis is the result of a balance between torques applied by a calibrated spring and those developed as a function of rotational speed (RPMs) about the central axis and/or aerodynamic forces acting upon the blades The intent for such systems is that the system will be driven to a desired equilibrium pitch angle at which the net torque is near zero.

Passive RPM control is thus typically achieved through the action of a spring that manifests a torque tending to reduce blade pitch in opposition to a torque implemented through suitable linkages from centrifugal forces upon fly-weights that urge the pitch of the blades to be increased when speed increases, thereby causing aerodynamic drag to slow the propeller down. This is the basis for passive constant-speed control mechanisms for aircraft propellers. Aerodynamic force acting upon the blades to produce feathering-axis torque is also involved in pitch control with the so-called Aeromatic propeller.

In both cases, accuracy and smoothness of control can be affected by friction torque changes of rolling-element thrust bearings: roughness or abrupt steps in rolling-element friction torque adding in to the net torque on a blade may then result in an equilibrium pitch angle that is offset from that achievable in the absence of such bearing friction, to the detriment of accuracy of control.

In an attempt to increase accuracy of control in such cases, the magnitude of the calibrated spring, RPM and aerodynamic torques might be intentionally increased relative to the undesirable rolling-element bearing torques, leading to increased bulk and weight of a design.

SUMMARY OF THE INVENTION

Instead, this disclosure urges the adoption of laminated rubber (i.e., elastomeric) thrust bearings, well known in the prior art (indicated in the referenced patents, e.g., U.S. Pat. No. 2,900,182, etc.). Elastomeric thrust bearings have been developed to deal with this kind of situation, especially for helicopter blade retention: very high compressive loads and limited angles of motion, with small size and no lubrication. These characteristics are the result of an elastomer-metal composite construction, comprising a circular stack of thin metal laminations or layers normal to the load, separated and bonded together by thin layers of rubber (as will be seen in the instant FIG. 2)

The torque of an elastomeric bearing is due to shear stress in the rubber layers, being essentially proportional to the rotation angle. The torque is little-affected by the thrust load; i.e., the elastomeric bearing is a torsional spring (as illustrated in the typical torque vs. deflection curve of FIG. 3). With insignificant friction as compared to the torque vs. displacement curve of FIG. 1 for a perfect rolling-element bearing, there is no abrupt reversal of torque with reversal of blade pitch angle. Elastomeric bearings require only a small torque proportional to the angle of motion, so that a change of direction at any point (including the zero point) results in smooth incremental and predictable changes in torque with no "jumps". As a consequence, employment of elastomeric thrust bearings for rotor or propeller blades in place of rolling-element bearings will result in more accurate passive pitch control.

The torsional stiffness or spring rate is dependent upon the type of elastomer and the dimensions of the bearing: specifically, for a given elastomer, the stiffness is proportional to the 4th power of diameter and inversely proportional to the total axial rubber thickness, although these parameters may vary somewhat with age and temperature. This rubber-related spring rate would add to that of any otherwise desired total spring rate of an overall mechanism.

In some such cases, it might be found desirable to minimize the torsional stiffness of an elastomeric thrust bearing, which would generally lead to using the smallest diameters possible: in particular, when the overall spring rate is to be minimized, or the accuracy of calibration of the overall spring effect is of paramount importance and effects of rubber parameter variation relative to the whole should be minimized.

In cases where the configuration permits, one way of achieving minimality of rubber-influenced spring rate is to employ a relatively small diameter elastomeric bearing imposed within a loading structure at the end of, rather than encircling the spindle or pitch shaft of the rotor or propeller hub. This configuration removes the need for an aperture in the bearing for passage of the thrust-conveying shaft through it. This not only minimizes the diameter of the bearing for a given loading area and average internal hydrostatic pressure, but also tends to maximize its columnar capacity, both well-known concerns for elastomeric bearing design.

BRIEF DESCRIPTION OF THE DRAWINGS

FIGS. 1 and 3 are typical torque vs. deflection curves for rolling-element and elastomeric bearings, respectively.

FIG. 2 represents the basic construction and function of an elastomeric thrust bearing.

FIG. 4 shows the hub of a rotor blade using an elastomeric thrust bearing encircling the spindle and interposed between two radial bearings.

DETAILED DESCRIPTION OF THE INVENTION

Figure 5:
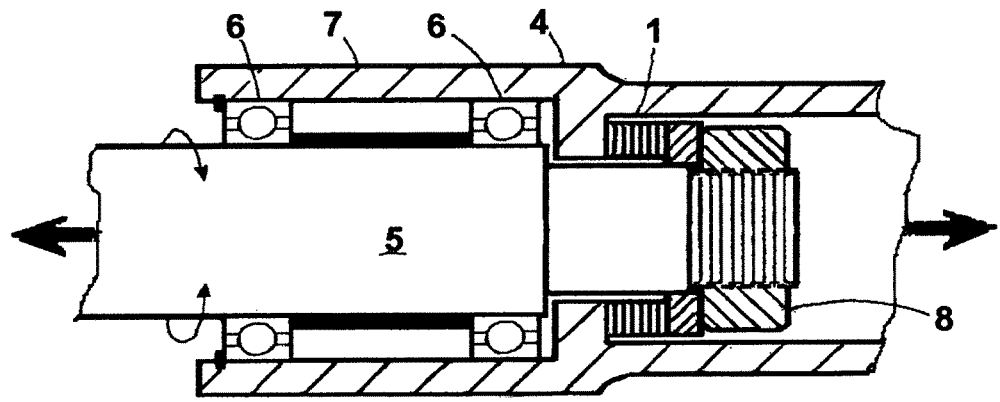
FIG. 5 shows the hub of a rotor blade using an elastomeric thrust bearing encircling the spindle and emplaced outboard of two radial bearings.

FIGS. 1 and 3 are typical torque vs. deflection curves for rolling-element and elastomeric bearings, respectively. FIG. 1 illustrates the instantaneous change in friction torque experienced by a rolling-element thrust bearing under high load conditions. FIG. 3 instead shows the smooth incremental change in torque experienced by an elastomeric bearing under the same conditions.

FIG. 2 represents the basic construction and function of an elastomeric thrust bearing 1. Laminated rubber or elastomeric bearings comprise a stack of many thin alternate layers of metal 2 (white) and rubber 3 (black) bonded together to form a solid mass. It may have a central aperture as shown. The bearing yields to partial rotation, which depends upon incremental movements between each of the metal layers via sideways shearing action within the intervening rubber layers. The illustration depicts the partial rotation of the top of the bearing, showing movement of a line that is vertical when drawn upon the bearing at rest. The line remains vertical on the metal layers, but shifts along with the rubber layers; so oscillation about the axis results in a distribution of action between the individual rubber layers. As this occurs, a spring-like proportional opposing force or torque develops, resulting from the rubber shear stress, but frictional resistance is negligible. Obviously, angular motion is limited by the stretch of the rubber in the layers, and continuous rotation is not possible.

At the same time, this stack of laminations can sustain very high normal forces between its top and bottom surfaces, such as 10,000 psi or more (depicted by the black arrow acting downwards upon the stack and resisted by the surface upon which it rests). But compression is very slight, because the rubber layers are too thin to squeeze out from between the metal layers (as thin as 0.002", but relatively few are shown, being thicker for clarity).

The laminations are flat in the illustrated cross-section, but their shape may instead may be truncated conical (as in a lampshade), hemispherical or wrapped into a cylindrical arc. So a laminated bearing can resist thrust, radial, or combined normal forces, depending upon the configuration of its laminate surfaces, while permitting limited lateral or angular movement between its opposed outer loading members.

FIG. 4 shows a cross-section of the hub 4 of a rotor blade using an elastomeric thrust bearing 1 encircling the spindle 5 and interposed between two radial bearings 6 within a housing 7. The spindle is retained against thrust within the housing by an end nut 8 and the internal ring locknut 9.

The pitch angular freedom of motion is shown by arrows 10, and the thrust load transmitted between the spindle 5 and the housing 7 is indicated by the heavy arrows pulling apart along the pitch axis 11, while the well-understood means of application of control torques about the pitch axis are not shown (this applies to all the following drawings as well).

FIG. 5 shows the hub 4 of a rotor blade using an elastomeric thrust bearing 1 encircling the spindle 5 and emplaced outboard of two radial bearings.6. The spindle is retained against thrust within the housing 7 by an end nut 8.

Figure 6:
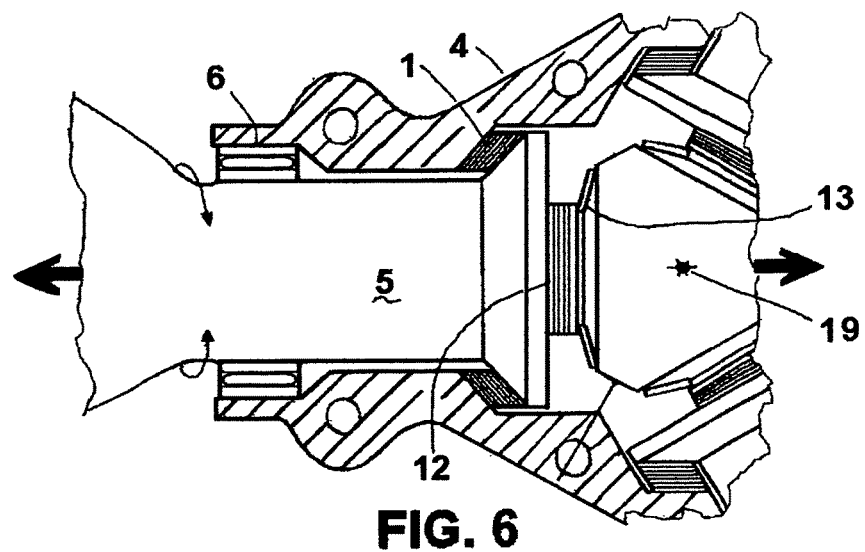
FIG. 6 shows the hub of a 3-bladed rotor using elastomeric conical bearings encircling each blade spindle and replacing one of two radial bearings.

FIG. 6 shows the central hub 4 and one blade with integral spindle 5 of a 3-bladed propeller, rotatable about an axis perpendicular to the paper, seen as the point 19. It employs elastomeric conical bearings 1, each of which and an associated radial bearing 6 are split into halves (unseen) allowing them to encircle the spindle 5. Another elastomeric thrust bearing 12, small and disk-like, is indicated to be pushed against the end of spindle 5 by a Bellville spring 13 in order to maintain positive pressure upon the conical thrust bearing at all times to keep it properly positioned when at rest while permitting free angular movement.

Figure 7:
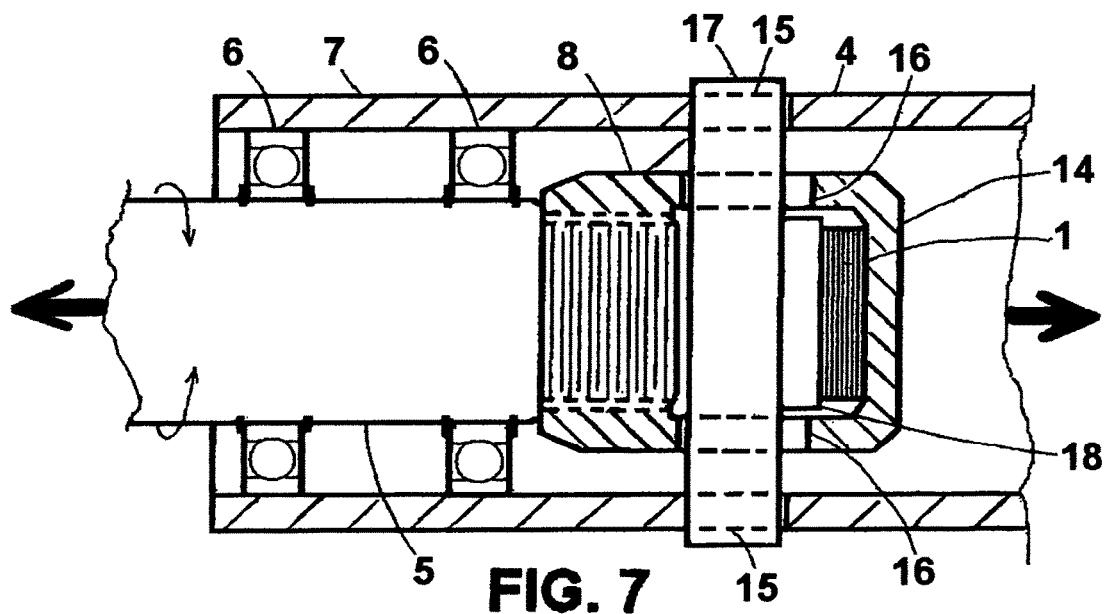
FIG. 7 shows the hub of a rotor blade using a small elastomeric thrust bearing enclosed within an end-nut structure extended beyond the spindle and outboard of two radial bearings.

FIG. 7 shows the hub 4 with a rotor blade spindle 5 supported within a housing 7 by two radial bearings 6. The spindle is capped by a cylindrical structure 8 that serves as an end-nut on the spindle and extends axially to an end-cap 14 that internally supports a small elastomeric thrust bearing 1. Housing 7 has two diametrically-opposed slots 15 and cylindrical structure 8 has two diametrically-opposed windows 16 that together permit beam 17 to pass transversely through them. Beam 17 serves to transfer the thrust load from the housing 7 through but not touching the windows 16 and impinging upon the thrust bearing 1 through a loading pad 18. The windows 16 are wide enough circumferentially to permit spindle 5 to rotate through the desired range of pitch angles relative to housing 7.

Figure 8:
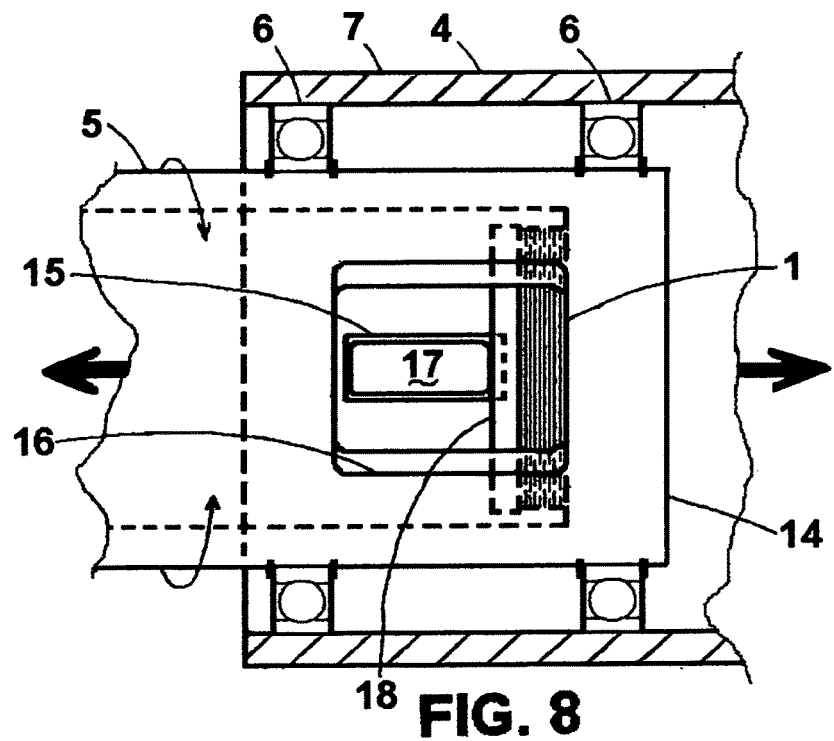
FIG. 8 shows the hub of a rotor blade using a small elastomeric thrust bearing within a hollow spindle and interposed between two radial bearing

FIG. 8 shows the hub 4 of a rotor blade with a hollow spindle 5 supported by two radial bearings 6 within housing 7. A small elastomeric thrust bearing 1 is positioned against the internal face of spindle end 14 between the radial bearings. Housing 7 has two diametrically-opposed slots 15 and hollow spindle 5 has diametrically opposed windows 16 that together permit beam 17 (seen end-on) to pass transversely through them (similar to FIG. 7). Beam 17 serves to transfer the thrust load from the housing 7 through but not touching the windows 16 and impinging upon the thrust bearing 1 through a loading pad 18. The windows 16 are wide enough circumferentially to permit spindle 5 to rotate through the desired range of pitch angles relative to housing 7.

FIGS. 7 and 8 illustrate just two of other possible configurations of structure, using a single beam to transfer thrust from the housing to the small elastomeric bearing. All such configurations would make possible the minimization of the bearing torque introduced into the balance of torques upon the pitch axis, thereby minimizing the effect of any variation of rubber properties upon the calibration of the overall spring effects.

It will be understood that the embodiments described above are merely exemplary and that persons skilled in the art may make many variations and modifications without departing from the spirit and scope of the invention as defined in the appended claims.

I claim:

1. A radial section of a hub of an airfoil blade of a rotor that transmits centrifugal force from a first end to a second end while permitting angular motion about a pitch axis, comprising: an outer member that supports two spaced radial bearings concentric with said axis and has two diametrically opposed outer windows; an inner member that is supported by said radial bearings and has a hollow closed end part that has two diametrically opposed inner windows proximate to said closed end, said inner windows being circumferentially wider than and aligned with said outer windows; an elastomeric bearing seated against the inner end of said closed end part; and a transverse beam passing through all four said windows and seated upon an edge of each said outer window and upon the exposed face of said elastomeric bearing such that said centrifugal force is transferred from said outer member to said inner member through said elastomeric bearing.

2. The radial section of claim 1 wherein said elastomeric bearing has flat laminates.

3. The radial section of claim 1 wherein said inner member is a hollow cylinder.

\* \* \* \* \*